United States Patent [19]
Crespel et al.

[11] Patent Number: 5,598,500
[45] Date of Patent: Jan. 28, 1997

[54] FIXING, EARTHING AND SEALING DEVICE FOR OPTICAL CABLES

[75] Inventors: Daniel Crespel, Lannion; Jean-Pierre Louboutin, Trebeurden, both of France

[73] Assignee: France Telecom, Paris, France

[21] Appl. No.: 582,303

[22] Filed: Jan. 3, 1996

[30] Foreign Application Priority Data

Jan. 9, 1995 [FR] France ................... 95 00161

[51] Int. Cl.$^6$ ........................................ G02B 6/00
[52] U.S. Cl. ........................ 385/139; 385/136; 385/137; 385/76; 385/77; 385/81; 385/87; 385/100
[58] Field of Search ................... 385/76, 77, 78, 385/86, 87, 139, 138, 136, 137, 84, 70, 147, 100, 103, 107, 101, 81

[56] References Cited

U.S. PATENT DOCUMENTS

| | | | |
|---|---|---|---|
| 4,705,352 | 11/1987 | Margolin et al. | 385/81 X |
| 4,842,364 | 6/1989 | Chen | 385/100 X |
| 5,117,475 | 5/1992 | Young | 385/81 |
| 5,181,272 | 1/1993 | Hopper | 385/139 |
| 5,185,844 | 2/1993 | Bensel, III et al. | 385/135 |
| 5,214,735 | 5/1993 | Henneberger et al. | 385/136 |
| 5,271,080 | 12/1993 | Hopper et al. | 385/76 |
| 5,280,556 | 1/1994 | Jones | 385/139 |
| 5,315,684 | 5/1994 | Szegda | 385/139 |
| 5,426,715 | 6/1995 | Moisson et al. | 385/76 |
| 5,440,666 | 8/1995 | Burek et al. | 385/135 |
| 5,446,823 | 8/1995 | Bingham et al. | 385/135 |

FOREIGN PATENT DOCUMENTS

| | | | |
|---|---|---|---|
| 0173576 | 3/1986 | European Pat. Off. | 385/100 X |
| 0255030 | 2/1988 | European Pat. Off. | 385/137 X |
| 0589618 | 3/1994 | European Pat. Off. | 385/137 X |
| 2264789 | 9/1993 | United Kingdom | 385/100 X |

*Primary Examiner*—Brian Healy
*Attorney, Agent, or Firm*—Pollock, Vande Sande & Priddy

[57] ABSTRACT

Device for fixing, earthing end sealing the end of an optical cable, including at least one optical module, an outer jacket, especially made of relatively deformable plastic, having a cylindrical general shape, freely surrounding the optical module consisting of a set of adjacent fibres which are independent or preferably housed in a confinement sheath, and at least one reinforcing element having a high mechanical strength, in particular a high tensile strength, in order to take up and absorb the forces exerted on the cable without transferring them to the optical module, wherein it includes an immobilizing member operating by clamping the jacket from outside the latter, at least one hollow protective sealing plug capable of being placed around and possibly crimped onto a part of the reinforcing element that extends from the front end of the jacket which has been cut beforehand in order to strip the optical module, this plug including a flange, possibly protruding, bearing against a plane surface made on the end of the jacket, and a locking assembly for clamping over the plug, this locking assembly being formed by two oppositive jaws which mutually interact, closing together onto the external surface of the plug in a diametral plane passing through the axis of the latter, means being furthermore provided for closing together the locking assembly for clamping over the plug with respect to the member for immobilizing the jacket, so as locally to compress the latter by means of the flange of the plug, thereby achieving sealing with respect to the outside of the reinforcing element extending into the thickness of the sheath, parallel with its longitudinal axis.

18 Claims, 4 Drawing Sheets

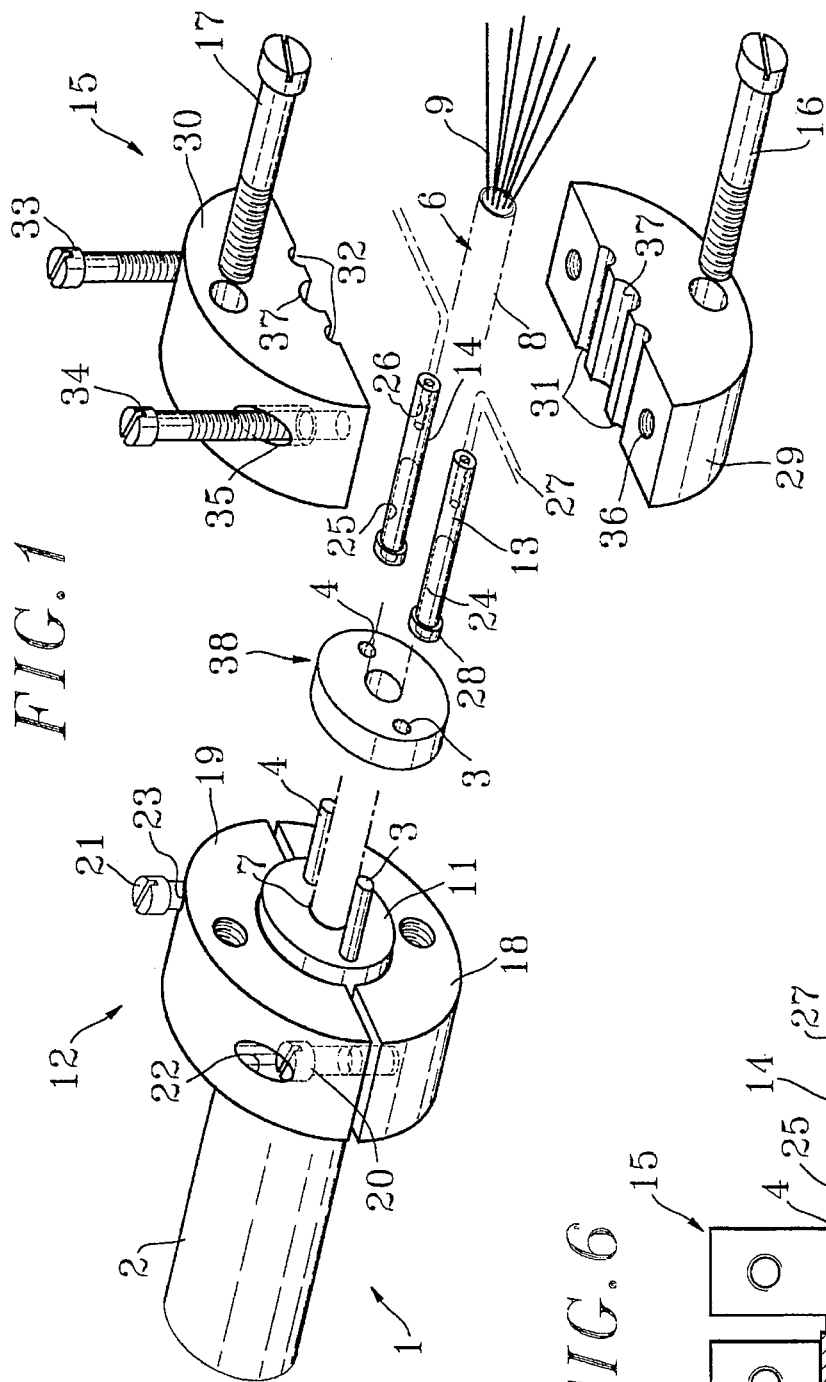
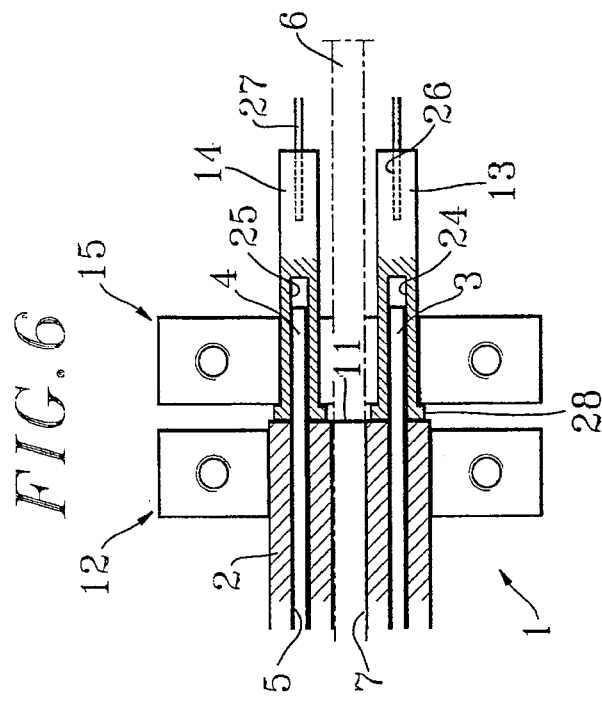

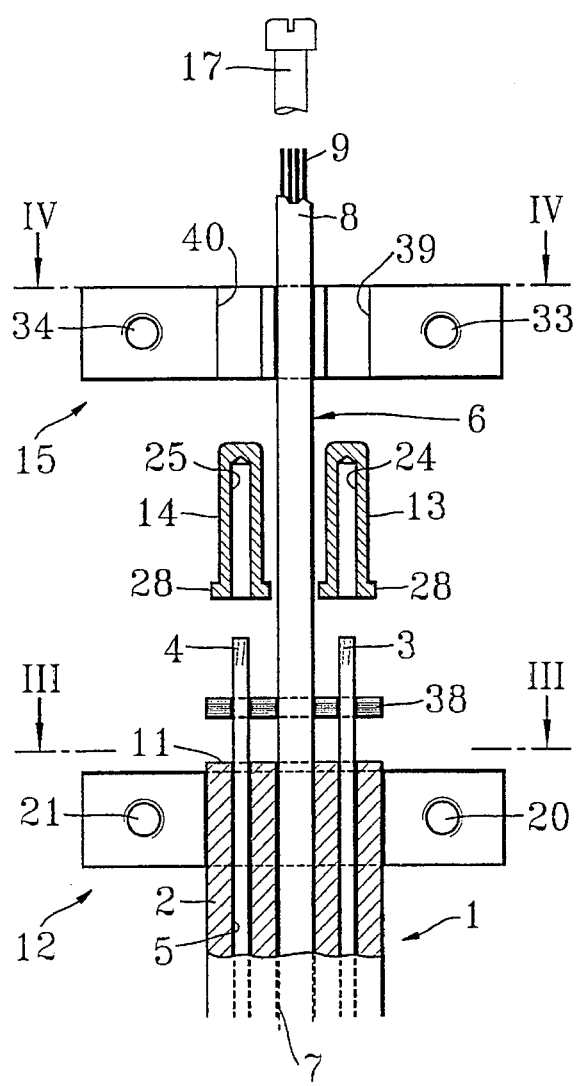
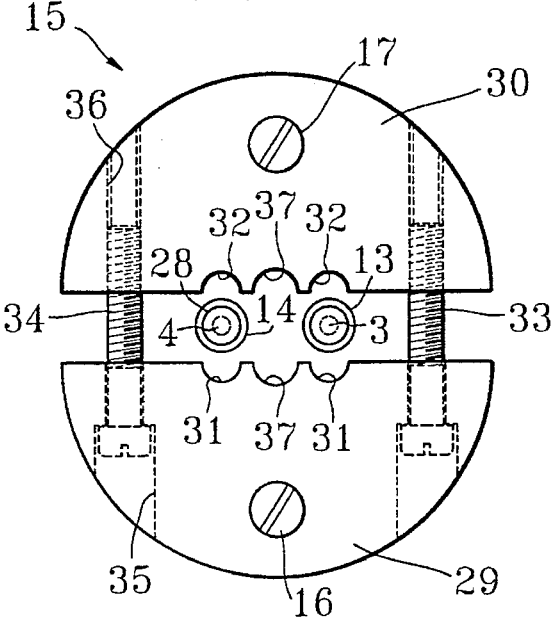
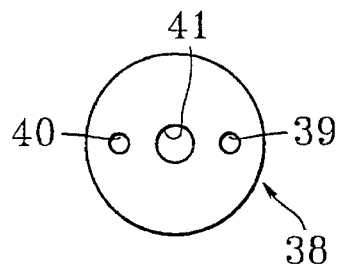
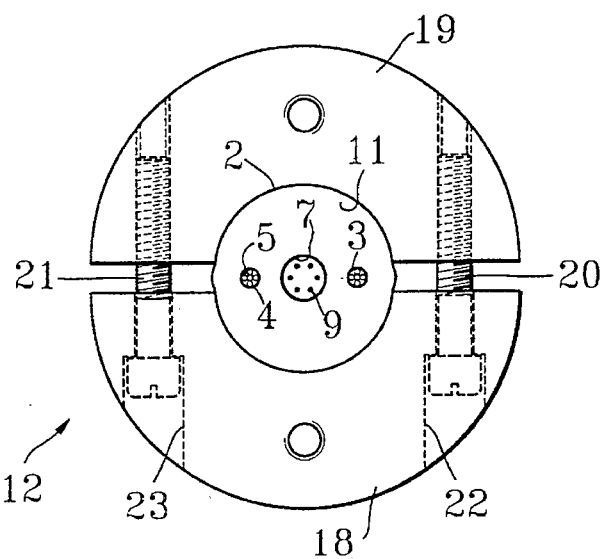

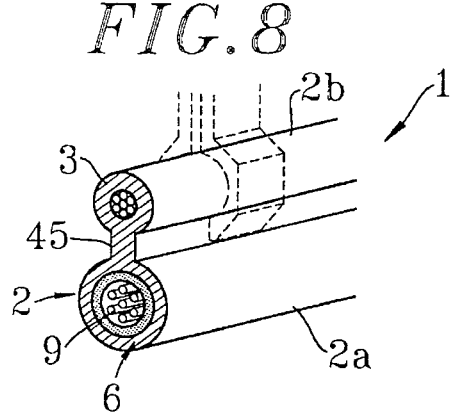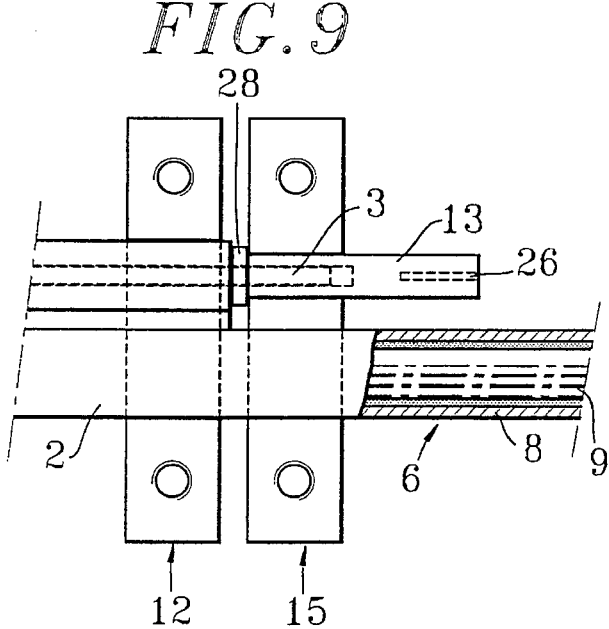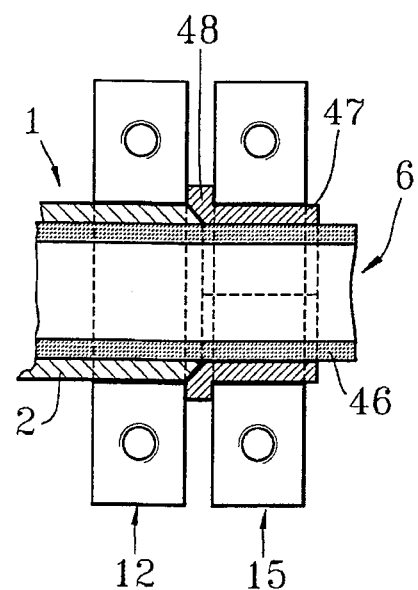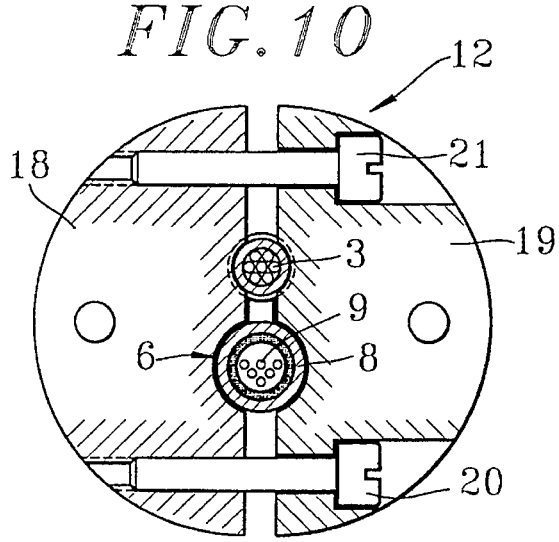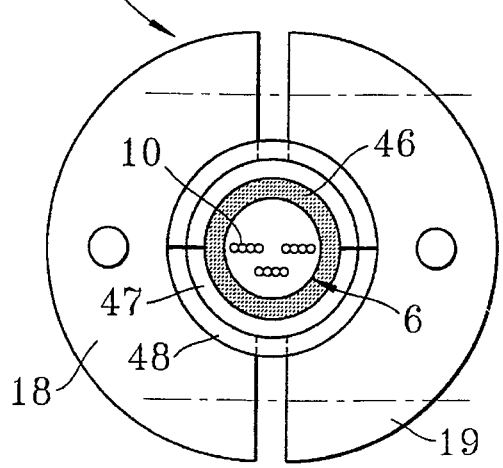

FIXING, EARTHING AND SEALING DEVICE FOR OPTICAL CABLES

BACKGROUND OF THE INVENTION

The present invention relates to a device for fixing, earthing and sealing the end or the unsupported part of a cable comprising at least one optical module, consisting of one optical fibre or a set of optical fibres which are independent or joined together into a ribbon, this device including an outer protective jacket inside which is arranged at least one reinforcing element intended, in particular, to prevent forces exerted on the cable from being transmitted to the optical module lying inside the jacket.

In current conventional solutions for cables of this kind, the optical fibres are more generally arranged directly in the central part of the sheath which is in the form of a reinforced tube or else in adjacent parallel passages, but inside the jacket.

The reinforcements, metallic or non-metallic, are preferably diametrically opposed and incorporated in the jacket while it is being manufactured by extrusion.

In particular, although not exclusively, these reinforcements may consist of steel strands which, although they have a high mechanical strength, are not sealed along their longitudinal direction, in such a way that, at the end of the cable where the optical fibres of the module or modules contained in the jacket may be joined together by appropriate splices to one or more application devices, or another cable (in the case of the in-line connection of two ends of cables), or else in the unsupported part of this cable in a stripped region thereof after removing a portion of the jacket in order to allow access to the optical module and to make a T-connection on one or more fibres thereof without cutting the remaining fibres, external moisture can travel along these strands, which has serious drawbacks.

Applying a material in the form of a gel around the reinforcements in the regions where the jacket is stripped may, at least in part, prevent this drawback but it runs the risk of contaminating the case or other connection member containing the splices for linking the optical fibres.

Moreover, in conventional solutions, on the end of a cable or in an intermediate region thereof, it is necessary to fasten this cable securely, in particular by suitably anchoring its reinforcements, further providing effective earthing when the latter are metallic.

However, in the known arrangements, commonly used in practice today, the fastening techniques employed do not allow immobilization of the reinforcements in the longitudinal direction of the cable, along the natural extension of these reinforcements, but use laterally offset locking means, which generally leads to a phenomenon of twisting and/or curvature of the jacket and the reinforcements, and may even cause this jacket to be cut, thereby creating stresses on the optical fibres themselves, above all if the reinforcements are forced to cross with respect to the exit axis of the optical fibres.

SUMMARY OF THE INVENTION

The subject of the present invention is a fixing and sealing device for optical cables which prevents these drawbacks, making it possible, on the one hand, to immobilize the reinforcements within the jacket in their natural direction without inducing forces on the optical fibres themselves, this device making it possible furthermore to achieve a high degree of sealing on these reinforcements, right at the regions where they emerge from the jacket cut beforehand, independently of the optical fibres which preserve their total integrity, which sealing prevents penetration of moisture into the jacket or into its contents, in the event of an accident on the unsupported part of the cable.

The invention also relates to a device which, in the case where the reinforcements of the jacket are metallic, enables these reinforcements to be earthed effectively, the means employed themselves being independent of the structure of the optical module or modules consisting of the fibres proper, it being possible for these fibres to be distributed either in a single module loosely arranged in a hollow part extending longitudinally at the centre of the jacket or in several parallel modules distributed in neighbouring passages, preferably arranged inside this jacket symmetrically with respect to the axis of the latter.

Finally, the object of the invention is to provide a device which is compact and, in particular, the overall size of which is sufficiently small so that it can, if required, be inserted or connected in an appended member fixed by its intermediary on the end of the cable, in order to allow it to be pulled when laying it into a duct.

For this purpose, the device in question, for fixing, earthing and sealing a cable, including at least one optical module, an outer jacket, especially made of relatively deformable plastic, having a cylindrical general shape, freely surrounding the optical module consisting of a set of adjacent fibres which are independent or preferably housed in a confinement sheath, and at least one reinforcing element having a high mechanical strength, in particular a high tensile strength, in order to take up and absorb the forces exerted on the cable without transferring them to the optical module, is characterized in that it includes an immobilizing member operating by clamping the jacket from outside the latter, at least one hollow protective sealing plug capable of being placed around and possibly crimped onto a part of the reinforcing element that extends from the front end of the jacket which has been cut beforehand in order to strip the optical module, this plug including a flange, possibly protruding, bearing against a plane surface made on the end of the jacket, and a locking assembly for clamping over the plug, this locking assembly being formed by two opposite jaws which mutually interact, closing together onto the external surface of the plug in a diametral plane passing through the axis of the latter, means being furthermore provided for closing together the locking assembly for clamping over the plug with respect to the member for immobilizing the jacket, so as locally to compress the latter by means of the flange of the plug, thereby achieving sealing with respect to the outside of the reinforcing element extending into the thickness of the sheath, parallel with its longitudinal axis.

Preferably, the reinforcing element consists of at least one metallic filament, especially a steel wire, this being in the form of one or more straight or twisted strands. In an alternative form, the reinforcement may be made of a composite material, of reinforced polymer, of the kind comprising a filament or a roving of organic, inorganic or metallic materials, incorporating a reinforcement consisting of natural or man-made fibres, especially of the kind comprising glass fibres or a plastic roving.

Also preferably, the outer jacket surrounding the optical module is made of high-density polyethylene. The hollow plug, for its part, consists of a metallic material, especially copper or aluminium.

In a preferred embodiment, the jacket includes two parallel reinforcing filaments, diametrically opposed with respect to a single optical module arranged in the axis of this tube-shaped jacket, the end of each of these two reinforcements being associated with a hollow protective sealing plug.

According to a particular characteristic, a flat seal is mounted between the plane surface on the end of the jacket and the flange of the hollow protective sealing plug of each reinforcement. Preferably, this seal is made of a plastic, similar to or different from that of the jacket. In particular, this seal may be made of a polymer or an elastomer.

According to another characteristic, the means for closing together the immobilizing member and the locking assembly for clamping over the plug consist of at least one, and preferably two, longitudinal screws parallel to the axis of the jacket, these screws being self-tapping or passing through the locking assembly and being engaged in tapped bores in the immobilizing member, or vice versa, in such a way that turning the screw clamps the member and the assembly together.

Advantageously, the member for immobilizing the jacket consists of two adjoining parts clamped against each other, trapping the jacket between them, these two parts being closed together by screws extending perpendicular to the axis of the jacket.

According to another alternative form, the jacket includes a central conduit from which extends the optical module which is arranged coaxially inside the reinforcing element which has a tubular profile and is housed in this conduit, the protective sealing plug being pierced axially by a hole in its bottom opposite its bearing flange in order for the module to pass freely.

Depending on the case, the seal and the plug are slipped over the end of the reinforcing element when the jacket is stripped at one end. In the case of lateral tap made on the optical module, the seal and the plug each consist of two parts, suitable for being put together in order to surround the optical module. If required, the seal may be cut laterally, its edges being mutually connected by an omega-shaped or other-shaped profile.

BRIEF DESCRIPTION OF THE DRAWINGS

Other characteristics of a device for fixing, earthing and sealing the end of an optical cable will furthermore appear during the following description of several embodiments, given by way of non-limiting indication, with reference to the appended drawings in which:

FIG. 1 is a partially exploded perspective view of a device in accordance with a first embodiment of the invention;

FIG. 2 is a view in axial section, seen from above, of the various parts of the device in FIG. 1;

FIGS. 3 and 4 are views in cross-section, respectively along the lines III—III and IV—IV in FIG. 2;

FIG. 5 is a front view of the seal employed in the embodiment according to FIGS. 1 to 4;

FIG. 6 is a view in longitudinal section of an alternative embodiment;

FIG. 8 is a perspective view, in section, of an optical-fibre cable including a particular enforcing element;

FIGS. 9 and 10 are views, respectively in elevation and in cross-section, of the device according to the invention, designed for fixing the cable according to FIG. 8;

FIGS. 11 and 12 are views similar to FIGS. 9 and 10, but relating to another alternative embodiment of the fibre-optic cable.

Drawn on these figures are identical reference numbers for designating members which are similar to one another.

DETAILED DESCRIPTION OF THE INVENTION

Figure 7:
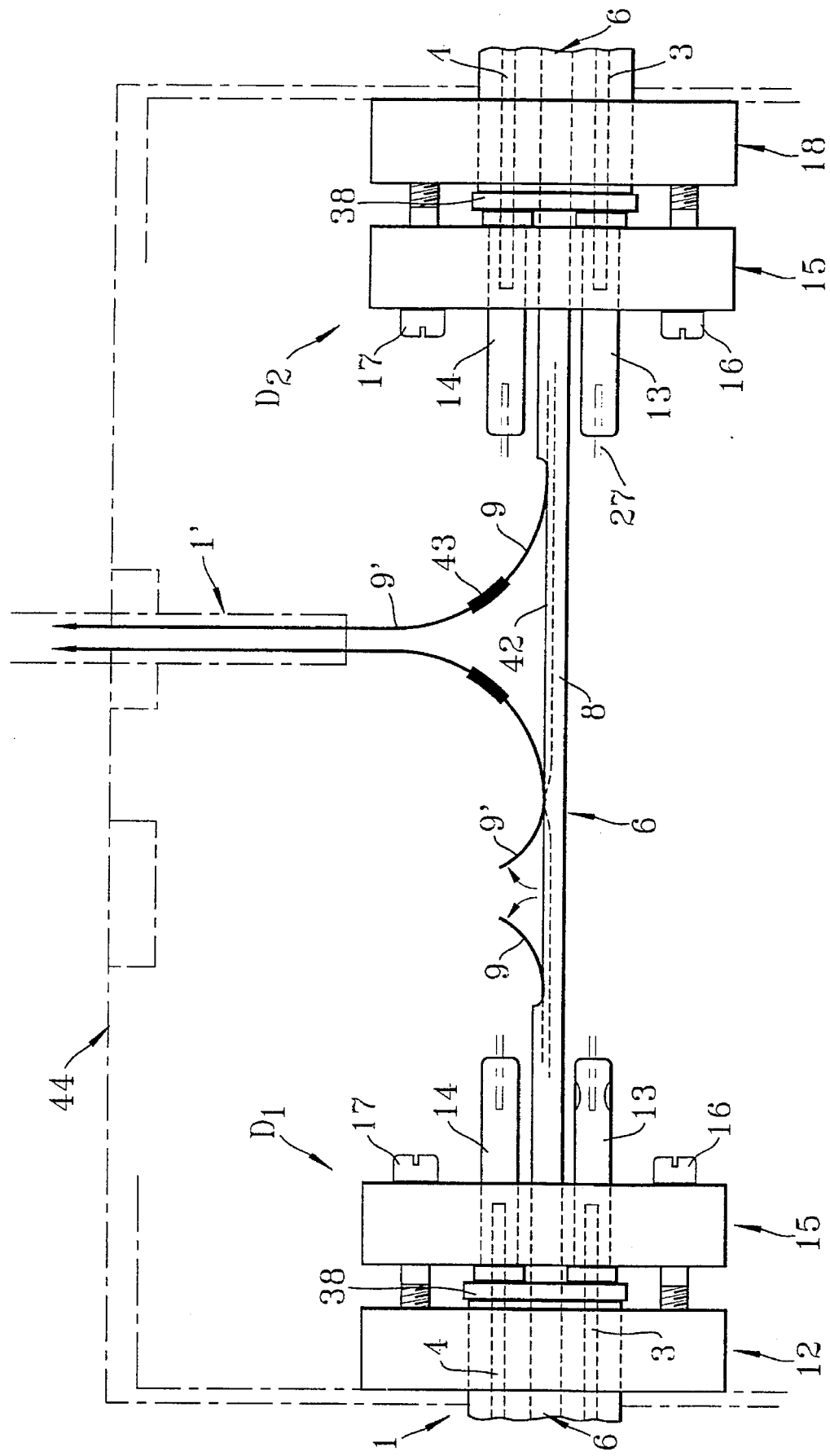
FIG. 7 illustrates an arrangement including two fixing and sealing devices in accordance with the first embodiment according to FIGS. 1 to 5, in which a lateral tapping of the optical module of the cable is produced with another similar module of a second cable independent of the first.

In the first embodiment shown in FIGS. 1 to 5, the reference 1 designates in general a fibre-optic cable, which includes, in this example, from its periphery towards its central axis, a protective jacket 2, generally made of a suitable plastic, especially high-density polyethylene, it being optionally possible for the jacket itself to be covered with an external protective sheath (not shown).

In the thickness of the jacket, preferably arranged symmetrically on either side of its central axis, are housed two reinforcing elements, respectively 3 and 4, each of these being in the form of a metallic filament or a strand of straight or twisted wires, advantageously made of steel, so as to impart a high mechanical strength to these reinforcements and above all to allow them to take up the tensile, compression or even bending forces and, depending on the case, to limit the thermal expansion phenomena, which may be exerted on the cable itself.

The reinforcing filaments 3 and 4 are preferably put in place in the jacket while it is being manufactured, each being housed inside a passage 5 provided in the thickness of the jacket 2, the two corresponding passages being parallel to each other and having a diameter adapted to the overall size of the metallic filaments which may have a slight play in these passages, which passages thereafter are not completely sealed, so much so that, at the end of the cable, when its jacket is cut as illustrated in FIGS. 1 and 2, the moisture of the ambient air can possibly penetrate between each filament and the internal surface of the corresponding passage in the jacket, which leads to the drawbacks already mentioned.

It should be noted that the reinforcing filaments 3 and 4 may be made of a material other than steel, for example by means of a composite material formed by fibres or rovings, these being bonded together by a resin which can polymerize on exposure to heat or to radiation, it being possible for each filament furthermore to include a stiffening reinforcement, especially one based on glass fibres.

Finally, arranged in the central part of the jacket 2 is an optical module 6 which extends along a conduit 7 provided along the axis of the cable 1, there being a sufficient play around the module 6 in this conduit so as to limit any reaction and friction force of the jacket on this conduit.

The optical module 6 consists, in a manner known per se, of an outer protective sheath 8 inside which extend, along the length of the cable, a plurality of optical fibres 9, these being independent or possibly joined together in several groups, these then being in the form of fibre ribbons 10, as is illustrated, for example, in the alternative form in FIG. 12. A filling material may be provided inside the sheath 8 around the fibres 9.

In accordance with the invention, the cable 1 thus formed is associated with a fixing and sealing device, capable especially, as shown in the first example considered in FIGS.

1 to 5, to be mounted on one of the ends of the cable, in a region of the cable where the jacket 2 has been cut transversely and the two metallic reinforcements 3 and 4, which protrude slightly from the corresponding cut face 11 of this jacket, only the optical module 6 being left intact, extending beyond its conduit 7 in the jacket, it being possible for one or more of the fibres 9 to be extracted from the sheath 8 and connected to any application device or connected to the end of another fibre, these not being shown in this case.

According to the invention, the device includes a member 12 for clamping and immobilizing the jacket 2, hollow protective plugs, respectively 13 and 14, for the projecting ends of the reinforcing filaments 3 and 4 and, finally, a locking assembly for clamping over these plugs, this assembly being provided with locking screws 16 and 17, making it possible to seal the arrangement and, in particular, to prevent external moisture from penetrating into the jacket or flowing outwards in the passages 5 of the reinforcing filaments.

Preferably, the hollow protective plugs 13, 14 are made of a metallic material, especially copper or aluminium, so as to be able to be easily compressed onto the ends of the reinforcing filaments 3 and 4, as explained later.

The clamping and immobilizing member 12 is produced by means of two semicylindrical half-rings 18 and 19, capable of being joined together around the jacket, clamping the latter from the outside, the two rings being closed together, in the common diametral plane in which they fit around the jacket, by means of screws, such as 20 and 21, engaged on either side of this jacket in drillholes 22 and 23, these being perpendicular to this plane provided in one of the two rings, these screws interacting with tapped bores in the other ring, or vice versa.

The hollow protective plugs 13 and 14 are provided so as to be fitted, from the outside, over the ends of the filaments 3 and 4 and, for this purpose, include internal blind housings designated in the drawings by the references 24 and 25. Each plug is closed at its opposite end, this end nevertheless possibly including a blind hole 26 suitable for receiving the end of an earthing wire 27 which engages in this hole in the manner of an electrical plug, as shown in FIG. 1, but not in FIG. 2 in order not to clutter up its drawing.

Moreover, on its end facing the jacket 2, each plug 13 and 14 includes a bearing flange 28, making it possible to achieve the necessary sealing right at this jacket in the region where the reinforcing filaments 3 and 4 emerge slightly therefrom.

Finally, the locking assembly 15 of the device includes two jaws, respectively 29 and 30, these being similar to the half-rings 18 and 19 of the immobilizing member but including certain specific arrangements.

In particular, the two jaws 29 and 30 include, in their plane faces intended to be closed together in order to clamp the hollow plugs 13 and 14 together, semicylindrical open housings 31 and 32, the diameter of which corresponds substantially to that of the plugs, in such a way that, when the two jaws are closed together by means of screws 33 and 34 which extend perpendicular to the plane faces of these jaws and in turn pass through drillholes 35 in one of them in order to interact with a tapped bore 36 provided in the other, the hollow plugs are progressively pressed and thus crimped onto the ends of the reinforcing filaments 3 and 4 engaged in the blind housing 24, 25 in these plugs 13 and 14.

In the central part, the jaws 29 and 30 each include a recess 37, having a larger radius than that of the housings 31 and 32 so as to allow the optical module 6 to pass freely through the locking assembly 15.

Finally, the device is completed by a flat seal 38 (see FIG. 5), preferably made of a polymer or elastomer, intended to be applied against the end surface 11 of the jacket 2 (see FIG. 2), this seal being in the form of a washer provided with two lateral drillholes, respectively 39 and 40, enabling the reinforcing filaments 3 and 4 to pass through the seal, and with a central hole 41 for the optical module 6 to pass through.

When mounting the device, after having stripped the jacket 2 right at its end face 11, leaving the ends of the reinforcing filaments 3 and 4 projecting, the immobilizing member 12 is put into place with its half-rings 18 and 19 clamping the jacket from the outside.

In a second step, the flat seal 38 is put in place in such a way that the filaments 3 and 4 pass through the drillholes 39 and 40 in it, the optical module 6, at the centre of the jacket, for its part passing freely through the hole 41 in this seal.

In the next step, the hollow plugs 13 and 14 are slipped over the ends of the reinforcing filaments 3 and 4 into the housings 24 and 25 in these hollow plugs, until their flange 28 butts up against the facing surface of the flat seal 38. If required, the ends of the earth wires 27 are slipped into the holes 26 in these plugs. The plugs 13 and 14 must be compressed before being immobilized.

In the following step, the two jaws 29 and 30 are put in place, without clamping the plugs 13 and 14, in such a way that these plugs can slide.

In the next step, the screws 16 and 17 are turned so as to move progressively towards the immobilizing member 12 the assembly 15 for locking the flanges 28 of the plugs 13 and 14 so as to bear on the joint 38, the latter itself being applied against the end face 11 of the jacket 2, blocking off the mounting clearance between the reinforcing filaments 3 and 4 and their passages 5 in the jacket 2, thereby achieving perfect sealing of the arrangement.

Finally, in a last step, the two aforementioned jaws 29 and 30 are clamped, by acting on the screws 20 and 21, so as to clamp the plugs 13 and 14, thereby crimping them onto the filaments 3 and 4.

In this arrangement, the reinforcing elements 3 and 4 remain immobilized in their natural direction, parallel to the axis of the cable 1, without causing these filaments to bend due to lateral twisting, as occurs in the solutions of the prior art.

Moreover, the controlled compression of the seal 38 on the plane end 11 of the jacket 2 allows limited compression of this joint, thereby enabling, by virtue of the flanges 28 of the hollow plugs 13 and 14, perfect sealing to be achieved, preventing any penetration of moisture into the jacket or preventing this moisture in the cable from going towards and getting into the case.

Advantageously, a suitable quantity of a sufficiently fluid product, such as a petroleum or silicone gel may be put in place right at the central conduit 7 through which the optical module 6 passes, once again preventing moisture from penetrating into this conduit but exerting no force on the optical module itself which remains perfectly free with respect to its jacket 2 and reinforcing elements 3 and 4.

In an alternative embodiment illustrated in FIG. 6, the flanges 28 provided on the ends of the plugs 13 and 14 interact directly with the plane face 11 made on the end of the jacket 2 of the cable 1 in order to achieve sealing with respect to the clearances provided between the passages 5 and the reinforcing filaments 3 and 4, thereby in this case avoiding the use, envisaged in the embodiment in FIGS. 1 to 5, of the flat seal 38.

In both of the above examples, provision was made for the jacket 2 of the cable 1 to be cut at the end of the latter so as to leave the optical module 6 free and to allow, if required, the fibres 9 contained in the latter to be connected directly to other fibres, or even to application devices.

The embodiment illustrated in FIG. 7 corresponds to a different use in which the optical module 6 is not cut transversely but only opened laterally by a lateral slit 42, enabling any one of the fibres 9 to be extracted from this module and to be connected by means of a splice 43 to a similar fibre 9' of a cable 1', separate from the cable 1 itself. FIG. 7 illustrates such an arrangement, which includes two devices, respectively D1 and D2, for a first cable 1, each of these devices, in accordance with the embodiments described, comprising an immobilizing member 12, a locking assembly 15, a flat seal 38 and screws 16 and 17 for moving these two parts closer together in a controlled manner, so as to make it possible, after crimping the hollow plugs 13 and 14 onto the ends of the reinforcements 3 and 4 of the cable [lacuna].

In this case, the optical module 6 is no longer cut, the cable 1' being connected by tapping with the cable 1, the fibres 9 and 9' of the two cables being joined together by their splices 43, as shown. The whole assembly is preferably mounted in an external splice case 44.

In the alternative form illustrated in FIG. 8, the cable 1 has a special shape, the jacket 2 surrounding, inside two separate parts 2a and 2b, respectively the optical module 6 and a reinforcing element 3 which, this time, is just a single one shifted laterally with respect to the region where the optical fibres 9 are distributed. The two parts 2a and 2b of the jacket are joined together by a linking strip 45.

In this embodiment, the device once again includes an immobilizing member 12 and a locking assembly 15, capable of crimping, from the outside, the hollow plug 13 which surrounds the end of the reinforcing element 3. In this case, the optical module 6 is no longer arranged axially between the half-rings 18 and 19 clamped together by the screws 20 and 21 but offset laterally with respect to the reinforcing element 3, as shown in FIGS. 9 and 10.

In another embodiment, shown diagrammatically in FIGS. 11 and 12, the cable 1 includes a jacket 2 but has a tube-shaped reinforcing element 46 housed coaxially inside the jacket surrounding the optical module 6.

In this alternative form, the reinforcing element passes through a hollow plug 47, pierced in its bottom in order to allow the optical module 6 to pass through freely, this plug including a flange 48 bearing on the end of the jacket in order to achieve the required sealing in the manner already explained.

Thus, a device of very simple design is produced which has the advantages already mentioned, especially fixing, along the axis, the various elements of the cable, furthermore achieving perfect sealing right at its reinforcing elements.

Of course, it goes without saying that the invention is not limited to the examples described hereinabove and shown in the appended drawings; on the contrary, it embraces all the alternative forms thereof which come within the scope of the hereto-appended claims.

In particular, in the case where the optical module itself is not cut, that is to say when one or more optical fibres of this module, but not all of them, are designed to be connected to other equivalent fibres of a cable, making a lateral tap on the first, it is clear that the seal 38, through which the optical module passes, can be put in place on the latter only in so far as it is cut beforehand laterally in order to be arranged around the sheath of the module.

In this case, the edges of the seal right at its cut are advantageously joined together by means of an omega-shaped or other-shaped profile which enables them to be connected in a secure manner after the seal has been put in place on the module.

In the alternative form in FIGS. 11 and 12, where the optical module passes through the plug for protecting the reinforcing element, this reinforcing element itself being of tube shape, it should be pointed out that the protective plug 46 must also be made in two parts which are brought together around this module.

Finally, in the preceding examples, it has been envisaged that the plugs 13 and 14 include, at their end intended to bear on the seal 38 or on the plane end face 11 provided at the end of the jacket 2, a slightly protruding flange 28, ensuring satisfactory compression in the sealing region. As a variant, this flange may be formed directly by the end of each plug 13, 14 or 47, not provided with a transverse shoulder, the plug then advantageously including raised features or striations in its external surface, in such a way that it can be moved, translationally in the direction of the sealing to be achieved, by the jaws 29 and 30 clamped directly over this or these plugs.

We claim:

1. Device (1) for fixing, earthing and sealing the end of an optical cable, including at least one optical module (6), an outer jacket (2), especially made of relatively deformable plastic, having a cylindrical general shape, freely surrounding the optical module consisting of a set of adjacent fibres (9) which are independent or preferably housed in a confinement sheath (8), and at least one reinforcing element (3, 4) having a high mechanical strength, in particular a high tensile strength, in order to take up and absorb the forces exerted on the cable without transferring them to the optical module, characterized in that it includes an immobilizing member (12) operating by clamping the jacket from outside the latter, at least one hollow protective sealing plug (13, 14, 46) capable of being placed around and possibly crimped onto a part of the reinforcing element that extends from the front end of the jacket which has been cut beforehand in order to strip the optical module, this plug including a flange (28), possibly protruding, bearing against a plane surface made on the end of the jacket, and a locking assembly (15) for clamping over the plug, this locking assembly being formed by two opposite jaws (29, 30) which mutually interact, closing together onto the external surface of the plug in a diametral plane passing through the axis of the latter, means (16, 17) being furthermore provided for closing together the locking assembly for clamping over the plug with respect to the member for immobilizing the jacket, so as locally to compress the latter by means of the flange of the plug, thereby achieving sealing with respect to the outside of the reinforcing element extending into the thickness of the sheath, parallel with its longitudinal axis.

2. Device according to claim 1, wherein the reinforcing element (3, 4) consists of at least one metallic filament, especially a steel wire, this being in the form of one or more straight or twisted strands.

3. Device according to claim 1, wherein the reinforcing element (3, 4) is made of a composite material, of reinforced polymer, of the kind consisting of a filament or roving of organic, inorganic or metallic materials, incorporating a reinforcement consisting of natural or man-made fibres, especially of the kind consisting of glass fibres or a plastic roving.

4. Device according to claim 1, wherein the outer jacket (2) surrounding the optical module (6) is made of high-density polyethylene.

5. Device according to claim 1, wherein the hollow plug (13, 14, 46) is made of a metallic material, especially copper or aluminium.

6. Device according to claim 1, wherein the jacket (2) includes two parallel reinforcing filaments (3, 4), diametrically opposed with respect to a single optical module (6) arranged in the axis of this tube-shaped jacket, the end of each of these two reinforcements being associated with a hollow protective sealing plug (13, 14).

7. Device according to claim 1, wherein a flat seal (38) is mounted between the plane surface (11) on the end of the jacket and the flange (28) of the hollow protective sealing plug (13, 14) of each reinforcement (3, 4).

8. Device according to claim 7, wherein the seal (38) is made of a plastic, similar to or different from that of the jacket.

9. Device according to claim 8, wherein the seal is made of a polymer or an elastomer.

10. Device according to claim 1, wherein the means for closing together the immobilizing member (12) and the locking assembly (15) for clamping over the hollow plug (13, 14) consist of at least one, and preferably two, longitudinal screws (16, 17) parallel to the axis of the jacket, these screws being self-tapping or passing through the locking assembly and being engaged in tapped bores in the immobilizing member, or vice versa, in such a way that turning the screw clamps the member and the assembly together.

11. Device according to claim 1, wherein the member (12) for immobilizing the jacket (2) consists of two adjoining parts (18, 19) clamped against each other, trapping the jacket between them, these two parts being closed together by screws (20, 21) extending perpendicular to the axis of the jacket.

12. Device according to claim 1, wherein the jacket (2) includes a central conduit from which extends the optical module (6) which is arranged coaxially inside the reinforcing element (46) which has a tubular profile and is housed in this conduit, the protective sealing plug (47) being pierced axially by a hole in its bottom opposite its bearing flange (48) in order for the module to pass freely.

13. Device according to claim 1, wherein the seal (38) and the plug (13, 14) are slipped over the end of the reinforcing element (3, 4) when the jacket is stripped at one end.

14. Device according to claim 1, wherein in the case of a lateral tap made on the optical module (6), the seal (38) and the plug (13, 14) each consist of two parts, suitable for being joined together in order to surround the optical module.

15. Device according to claim 14, wherein the seal (38) is cut laterally, its edges being mutually connected by an omega-shaped or other-shaped profile.

16. Device according to claim 5, wherein each metal plug (13, 14, 47) is joined to a wire (27) for earthing the cable (1).

17. Device according to claim 16, wherein the wire (27) is engaged, in the manner of an electrical plug, in a blind hole (26) provided on the end of the plugs (13, 14) which is opposite the flange (28).

18. Device according to claim 1, wherein each hollow plug (13, 14, 47) includes an external surface which is striated or provided with raised features engaging with the jaws (29, 30) of the locking assembly (15).

* * * * *